No. 822,923. PATENTED JUNE 12, 1906.
W. T. COBB.
BARBER'S POLE.
APPLICATION FILED JAN. 31, 1906.
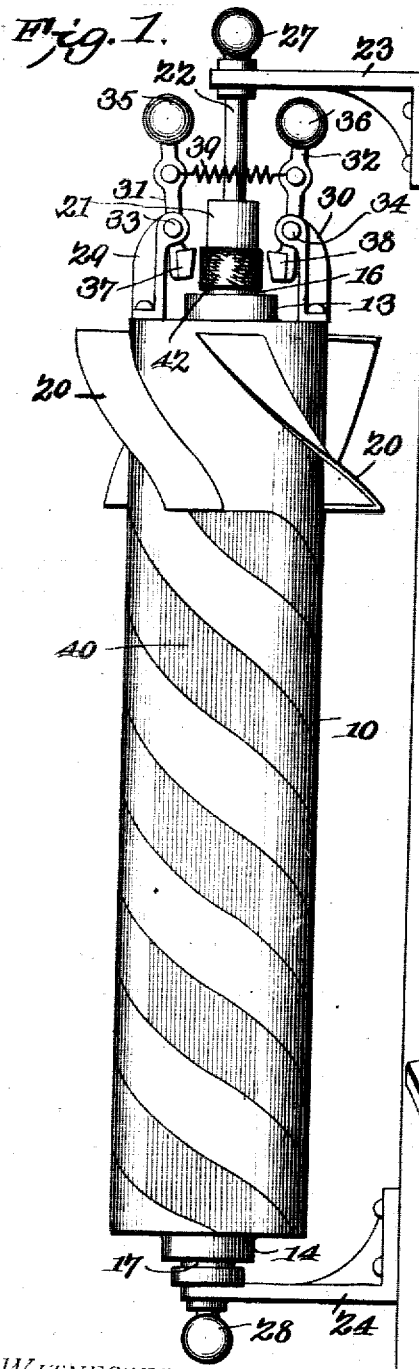
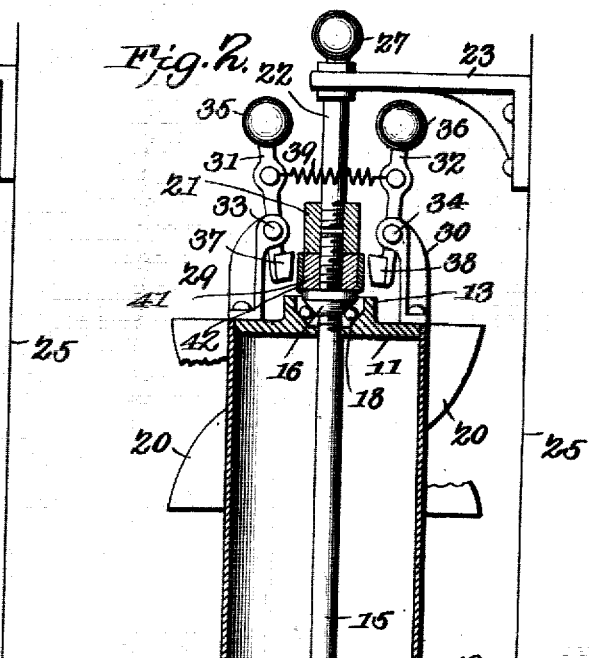
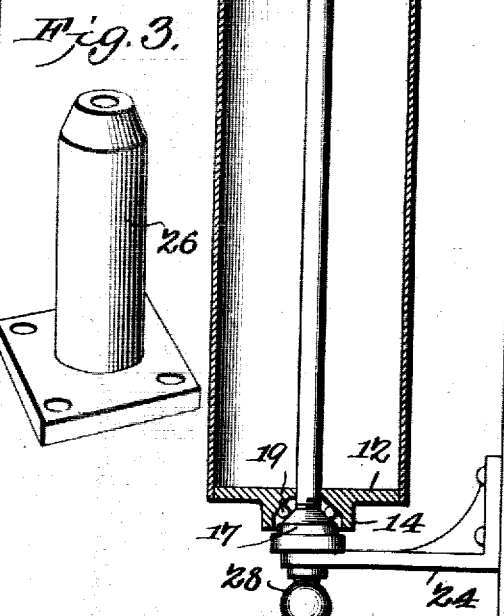
WITNESSES:
William T. Cobb INVENTOR
ATTORNEYS

UNITED STATES PATENT OFFICE.

WILLIAM T. COBB, OF LAMONTE, MISSOURI.

BARBER'S POLE.

No. 822,923.

Specification of Letters Patent.

Patented June 12, 1906.

Application filed January 31, 1906. Serial No. 298,886.

*To all whom it may concern:*

Be it known that I, WILLIAM T. COBB, a citizen of the United States, residing at Lamonte, in the county of Pettis and State of Missouri, have invented a new and useful Barber's Pole, of which the following is a specification.

This invention relates to improvements in advertising devices, more particularly to barbers' poles and similar structures, and has for its object to simplify and improve the construction and increase the utility and efficiency of devices of this character.

With these and other objects in view, which will appear as the nature of the invention is better understood, the invention consists in certain novel features of construction, as hereinafter fully described and claimed.

In the accompanying drawings, forming a part of this specification, and in which corresponding parts are denoted by like designating characters, is illustrated the preferred form of the embodiment of the invention capable of carrying the same into practical operation.

In the drawings, Figure 1 is a side elevation. Fig. 2 is a longitudinal sectional elevation. Fig. 3 is a perspective view of a modified form of the supporting means.

The improved device comprises a shell or casing 10 of any approved form or size, but preferably tubular, and with ends 11 12. The shell is preferably of sheet metal and the ends of cast or pressed metal and with central bearings 13 14, through which a shaft 15 extends. The shaft is provided with cone-collars 16 17, and the bearings 13 14 are provided with conical interiors, the conical bearings and conical collars designed to support balls 18 19 between them, and thus provide ball-bearings to the shell 10 and its ends 11 12. The shell 10 is provided with curved and inclined wings 20, extending therefrom near one end, against which the wind operates to rotate the shell upon the shaft, as hereinafter explained. The shaft 15 is threaded at the ends, and the cone-collars 16 17 are also threaded and engage these threaded portions of the shaft in reverse position. By rotating the upper cone-collar upon the shaft it will be adjusted longitudinally thereof, and thus provide means for the requisite adjustment between the cones and bearings.

Engaging the upper threaded end of the shaft 15 is a cylindrical member 21, and supported in the member 21 is a section 22 of a shaft in longitudinal alinement with and continuing the main shaft 15. Bearing upon the shaft 15 between the cone-bearing 16 and the sleeve 21 is a collar or disk 41, preferably covered with leather or the like and indicated at 42, the member 41 being thus rigidly clamped between the sleeve 21 and cone-bearing 16. The sleeve 21 thus performs three functions, first, as a coupling means between shafts 15 and 22; second, as a clamping means to hold the brake-bearing 41 42 in position, and, third, as a jam-nut to prevent the parts 41 and 16 from working loose.

The shaft 15 and its extension 22 are supported rigidly in a vertical position either in spaced brackets 23 24, attached to a wall 25 or other stationary structure or in a base of suitable size, as represented at 26 in Fig. 3, or by other suitable means. When the device is supported in brackets, as in Figs. 1 and 2, the ends of the shaft members will be provided with ornamental finishing members, as at 27 28, and when supported upon the base 26 the upper ornamental member 27 only will be employed.

Rising from the upper end member 11 of the shell are standards 29 30, in which arms 31 32 are pivoted at 33 34 and with balls or weights 35 36 upon the outer ends and shoes 37 38 at the lower ends, the latter for bearing upon opposite sides of the member 41 when the upper weighted ends of the arms are distended by centrifugal force. A spring 39 is connected to the arms 31 32 above the standards and operating to maintain the shoes normally out of contact with the member 41. The weighted arms 31 32, with their shoes 37 38, thus serve as an automatic governor to control the speed of the shell and its attachments, as hereinafter explained.

The shell or casing 10 is designed to be ornamented or provided with any desired matter of an advertising nature or otherwise, but, as before stated, is particularly adapted for use as a barber's sign or "pole," and to this end the shell is shown provided with spirally-disposed bands 40 of contrasting shades, as in the usual form of barbers' signs.

By this arrangement the shell 10 and its attachments will be rapidly rotated by the action of the wind upon the wings 20, and so long as the speed is normal the springs 39 will maintain the arms 31 32 in their inoperative position or with the shoes 37 38 out of contact with the member 41; but any abnormal increase of speed will cause the arms 31 32 to be distended at the weighted ends and compress the shoes 37 38 upon the member 41 and retard the motion of the shell, the force of the pressure corresponding to the speed of the wind. The speed of the shell is thus automatically controlled and governed, as will be obvious.

Having thus described the invention, what is claimed is—

1. In a device of the class described, a stationary shaft, conical collars spaced apart upon said shaft with one of said collars adjustable thereon, a shell having circumferentially-disposed exterior wings and inclosing said shaft between said collars and provided with bearings adjacent to the same, bearing-balls between said collars and bearings, a brake-block bearing upon said adjustable collar, a sleeve adjustable upon said shaft and bearing upon said block, arms swinging from said shell and having shoes at one end for bearing upon said block and weighted at their other ends, and a spring connecting the arms and operating to maintain them normally in inoperative position.

2. In a device of the class described, a stationary shaft, bearing-collars spaced apart upon said shaft, with one of said collars adjustable on the shaft, a shell rotatively mounted upon said bearings and provided with means whereby the same is rotated by the influence of the wind, a brake-block carried by said shaft and bearing upon said adjustable collar, a sleeve adjustable upon said shaft and bearing upon said block, arms swinging from said shell and having shoes at one end adjacent to said block and weighted at the other ends, and yieldable means for holding said shoes out of contact with said brake-block.

3. In a device of the class described, a stationary shaft, bearing-collars spaced apart upon said shaft, a shell rotative upon said bearings, means whereby said shell is rotated by the influence of the wind, a brake-block bearing upon one of said shaft-bearings, a sleeve adjustable upon said shaft and bearing upon said block and levers swinging upon said shell and having shoes at one end for bearing upon said block and weighted at their other ends, and yieldable means for holding said shoes out of contact with said brake-block.

In testimony that I claim the foregoing as my own I have hereto affixed my signature in the presence of two witnesses.

WILLIAM T. COBB

Witnesses:
A. W. CHATHAM,
R. E. FOWLER.